United States Patent
Gärtner

(10) Patent No.: US 6,397,597 B1
(45) Date of Patent: Jun. 4, 2002

(54) INTERNAL COMBUSTION ENGINE HAVING A TURBOCHARGER HAVING VARIABLE TURBINE GEOMETRY

(75) Inventor: Uwe Gärtner, Remshalden (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/466,718

(22) Filed: Dec. 17, 1999

(30) Foreign Application Priority Data

Dec. 17, 1998 (DE) .......................................... 198 58 293

(51) Int. Cl.⁷ ................................................ F02B 33/44
(52) U.S. Cl. ................... 60/605.2; 60/605; 123/568.12; 415/164; 415/158
(58) Field of Search ............................. 60/605.1, 605.2, 60/602; 123/568.12; 415/164, 158, 157, 150, 166

(56) References Cited

U.S. PATENT DOCUMENTS

| | | | | |
|---|---|---|---|---|
| 3,824,032 A | * | 7/1974 | Schegolev et al. .......... | 415/150 |
| 4,586,878 A | * | 5/1986 | Wichger ...................... | 415/166 |
| 4,770,603 A | * | 9/1988 | Engels et al. ............... | 415/164 |
| 4,804,316 A | * | 2/1989 | Fleury ........................ | 415/164 |
| 5,406,796 A | * | 4/1995 | Hiereth et al. ............. | 60/605.2 |
| 5,487,273 A | * | 1/1996 | Elpern et al. ................ | 60/602 |
| 5,611,202 A | * | 3/1997 | Sumser et al. ............. | 60/605.2 |
| 5,738,126 A | * | 4/1998 | Fausten ...................... | 123/569 |
| 5,802,846 A | * | 9/1998 | Bailey ........................ | 60/605.2 |
| 6,029,451 A | * | 2/2000 | Gartner ...................... | 60/605.2 |
| 6,035,640 A | * | 3/2000 | Kolmanovsky et al. .... | 60/605.2 |
| 6,067,798 A | * | 5/2000 | Okada et al. ................ | 60/602 |
| 6,120,246 A | * | 9/2000 | Auger et al. ................. | 60/602 |
| 6,202,414 B1 | * | 3/2001 | Schmidt et al. ............ | 60/605.2 |

FOREIGN PATENT DOCUMENTS

| | | | | |
|---|---|---|---|---|
| DE | 4319380 A1 | * 12/1993 | .................. | 60/602 |
| DE | 195 43 190 | 5/1997 | | |
| DE | 198 57 234 A1 | * 6/2000 | .................. | 60/602 |
| EP | 0 620 365 | 10/1994 | | |

* cited by examiner

Primary Examiner—Thomas Denion
Assistant Examiner—Thai-Ba Trieu
(74) Attorney, Agent, or Firm—Kenyon & Kenyon

(57) ABSTRACT

An internal combustion engine having a turbocharger with variable turbine geometry includes a compressor and an exhaust-gas turbine, whose turbine geometry can be adjusted to adjustably set the effective turbine cross section area. Using a closed-loop and open-loop control device, the operating state of the internal combustion engine can be detected, and the internal combustion engine can be adjusted as a function of the load and state. A movable limit stop is provided for limiting the control path of the variable turbine geometry, the limit stop being adjustable between a limiting position that limits the control path of the variable turbine geometry and a release position outside of the control path of the turbine geometry.

14 Claims, 3 Drawing Sheets

INTERNAL COMBUSTION ENGINE HAVING A TURBOCHARGER HAVING VARIABLE TURBINE GEOMETRY

The invention relates to an internal combustion engine having a turbocharger with variable turbine geometry.

DESCRIPTION OF RELATED ART

In supercharged diesel internal combustion engines used in commercial vehicles, it is known to furnish the turbines of the turbochargers with variable geometry to adjustably set the effective turbine cross section. In this way, it is possible to achieve desired levels of exhaust backpressure in the segment between the cylinders and the turbocharger, as a function of the operating state of the internal combustion engine. As a result of the variable geometry the power output of the turbine and the work done by the compressor can be adjusted as needed. A supercharged internal combustion engine having variable turbine geometry is known, for example, from German Patent Application 195 43 190 A1.

To achieve an engine braking effect during braking operation of the internal combustion engine, the inlet guide baffle of the turbine is placed in a blocking position in which the turbine cross section is significantly reduced, so that a high exhaust backpressure is then built up, opposing the expulsion through exhaust valves into the exhaust-gas manifold of the air being compressed in the cylinder. In the engine braking operation, the piston in the compression and exhaust stroke must perform compression work against the high overpressure in the exhaust manifold, as a result of which a powerful braking effect is achieved.

In addition, it is known from the published European Patent Application 620 365 A1, that to limit nitrous oxide emissions the exhaust gas of supercharged internal combustion engines should be routed back into the intake line, when the engine produces power. In accordance with European Patent Application 620 365 A1, a second smaller turbocharger is attached parallel to a main turbocharger, and is employed exclusively for transferring the exhaust gas. Exhaust gas is extracted downstream of the turbine of the main turbocharger, is compressed in the compressor of the smaller turbocharger, and is fed again into the intake pipe of the engine. It is disadvantageous that the exhaust gas extracted downstream of the turbine is already expanded, so that only a very small energy potential is still available for driving the smaller turbine of the supercharger employed for conveying the exhaust gas. A further disadvantage lies in the cumbersome design of the device, encompassing two turbochargers, as a result of which construction costs, space requirements, and factory costs are increased.

SUMMARY OF THE PRESENT INVENTION

The invention is a supercharged internal combustion engine having variable turbine geometry in such a manner that, using simple means and at small cost, an exhaust-gas recirculation system can be realized that avoids overtaxing the engine in extreme operating ranges.

According to a first inventive embodiment, the range of motion of the variable turbine geometry is limited by a movable limit stop, which, in the event that the exhaust gas recirculation is opened or is about to be opened, limits the adjustment range of the variable turbine geometry to a definite, preselected value. This embodiment has the advantage that no cumbersome closed-loop control is necessary for adjusting the turbine geometry. Rather, in a manner that is preferably controlled by open-loop and not by closed-loop, the turbine geometry is adjusted between the open position and a blocking position, until the limit stop is reached. The limit stop is moved from its release position, outside a control path defining the range of motion of the turbine geometry, to the limiting position in which the adjustment range of motion of the turbine geometry is limited. By dispensing with the closed-loop control in adjusting the turbine geometry, the control-engineering problems that can arise at small rotational speeds through the strong dependence of the exhaust-gas recirculation rate on the position of the turbine geometry are avoided.

To determine the releasing criterion for moving the limit stop from the release position to the limiting position, the conditions for the start of exhaust-gas recirculation are considered. If the conditions are met, then the limit stop is placed in the limiting position. Conversely, in the event that the conditions for the exhaust-gas recirculation are not satisfied, the limit stop is placed back into the release position and the recirculation of the exhaust gas from the exhaust-gas line into the intake line is interrupted. In the release position of the limit stop, the turbine geometry can move along the entire control path unhindered. The exhaust-gas recirculation and limit stop are actuated by actuating signals generated in a closed-loop and open-loop control device.

In order to create the pressure conditions necessary for exhaust-gas recirculation, which include an exhaust-gas backpressure that is higher than the boost pressure, it is advisable to initially position the limit stop in the limiting position, so that the turbine entry cross section is reduced and the exhaust-gas backpressure rises. As soon as the exhaust-gas back pressure exceeds the boost pressure, the exhaust-gas recirculation system is opened.

A limiting piston can be conveniently used as an adjustable limit stop which can be actuatable mechanically, electrically, hydraulically, or pneumatically.

The limit stop is used advantageously for limiting the movement range along the control path of a control element that acts upon the turbine geometry and that moves the latter between the blocking position and the open position. This indirect limiting of the range of motion of the turbine geometry has the advantage that the effective turbine cross section is neither hindered nor infringed upon by the limit stop extending into the control path. If appropriate, however, it can also be advantageous to directly limit the position of the variable turbine geometry by the limit stop.

When the exhaust-gas recirculation system is activated, it is preferable that the limit stop adopt only one single, defined limiting position independent of the rotational speed, the limiting position representing an optimal value for a specific rotational speed. Depending on the engine load, this usually results in recirculation rates of about 5% to about 25%, that are adjusted for the specific rotational speed. The recirculation rate is the ratio of the re-circulated exhaust-gas flow to the entire mass flow fed to the cylinders, composed of fresh air and exhaust gas. As the rotational speed rises, the exhaust-gas recirculation rate also rises, assuming the limiting position of the limit stop has not been altered. Since the internal combustion engine can tolerate higher exhaust-gas recirculation rates as the rotational speed and boost pressure rise, the increasing exhaust-gas concentration is nevertheless tolerable, so that even if the limit stop has only one limiting position resulting in the turbine geometry having only one position for all rotational speed ranges, satisfactory results can be achieved.

For more precise adjustment of the quantity of re-circulated exhaust gas, it can be advantageous to assign a different limiting position of the limit stop to different rotational speeds. In this manner, an optimized exhaust gas recirculation rate is attained, and an undesirably high exhaust-gas concentration is avoided. It is advantageous to assign the limiting positions to the rotational speeds in discrete steps, a limited number of limiting steps being assigned to an equal number of rotational speed ranges. In a preferred embodiment, provision is made for two limiting positions corresponding to two different rotational speed ranges. This number of limiting positions is usually adequate for a sufficiently precise exhaust gas recirculation (EGR) rate.

The discrete, two-step assignment of two limiting positions to two rotational speed ranges is advantageously realized with the assistance of two different limit stops, which can be two limiting pistons, both of which are able to enter into the control path of the turbine geometry at different limiting positions. The given limiting position is set by activating the respective limiting piston as a function of the rotational speed range detected by the closed-loop and open-loop control device, in the event that active exhaust-gas recirculation occurs.

In a further advantageous embodiment, provision is made for only one single limit stop, which adopts various limiting positions as a function of the rotational speed resulting in a space-saving design. Moreover, in addition to discrete adjustment, a continuous adjustment of the limit stop is also possible, so that the greatest possible precision can be achieved.

In accordance with a second inventive embodiment, an exhaust-gas intercooler is disposed in the recirculation line of the exhaust-gas recirculation system. Charge air is used as a coolant in the exhaust-gas intercooler. In this way, when turbochargers having variable turbine geometries are employed, it is possible to use the excess air flowing in the intake line for cooling the hot, re-circulated exhaust gas. The boost pressure of the engine is thus limited, as a result of which it is assured that peak pressure limits are not exceeded, above which damage can occur to the engine. The heat removed from the charge air in the coolant circuit can be expelled into the surrounding atmosphere. In contrast to conventional exhaust-gas recirculation water coolers, no heat dissipation via the cooling system of the engine is necessary, so that fuel is saved due to the smaller power requirements of fans and water pumps.

In an advantageous embodiment, provision is made at the compressor entry for an air mass sensor, which measures the air mass flow entering into the compressor in order to establish the combustion air ratio. If an excess of air is determined, then the excess air component is expelled via the exhaust-gas cooler.

In further embodiments, in place of an air mass sensor at the entry of the compressor, it is possible also to use a pressure sensor in the charge air pipe or a lambda sensor in the exhaust-gas pipe to determine the combustion air ratio.

DETAILED DESCRIPTION OF PREFERRED EMBODIMENTS OF THE INVENTION

Figure 1:
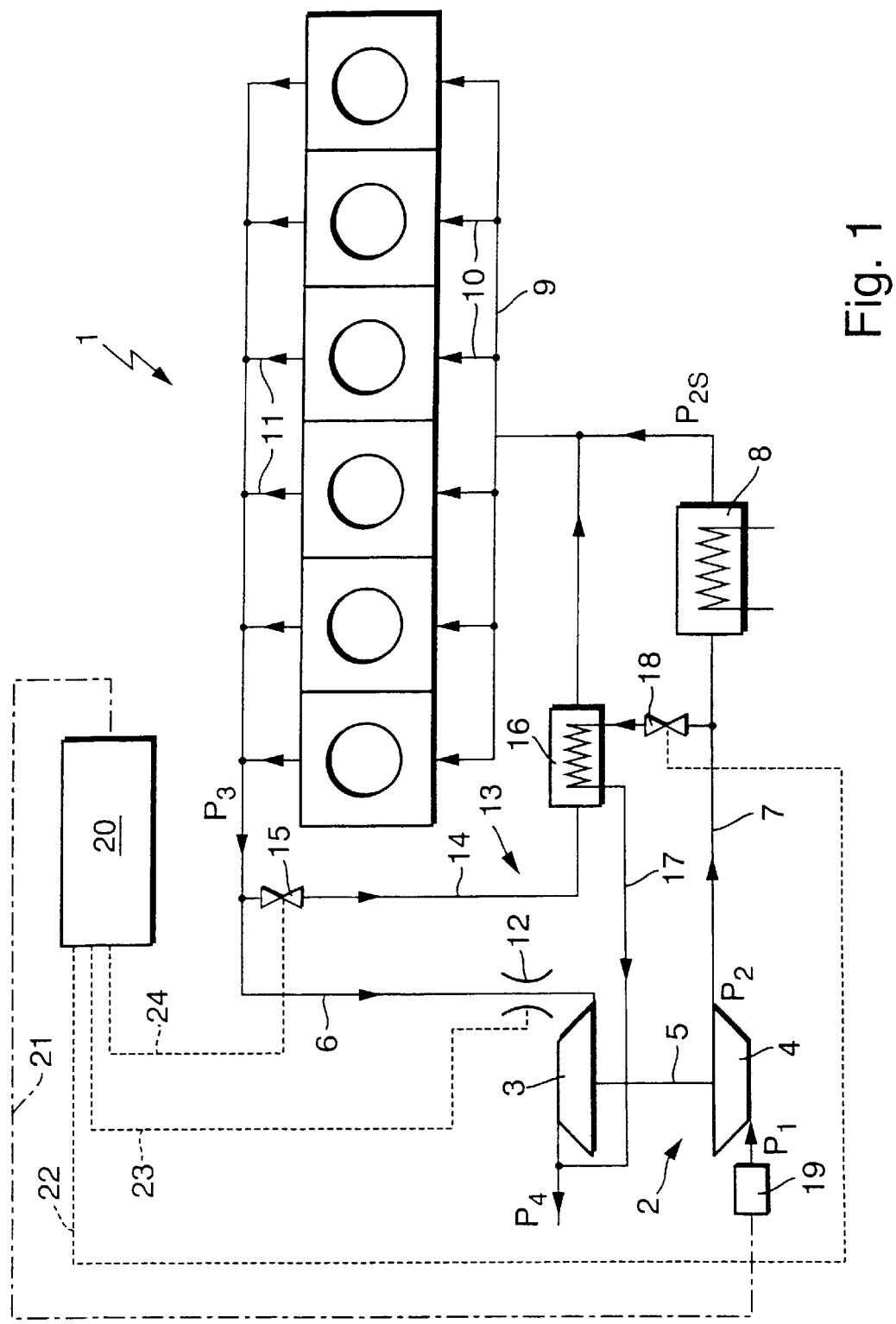
FIG. 1 shows a schematic representation of a turbocharged internal combustion engine having exhaust-gas recirculation.

Internal combustion engine 1 depicted in FIG. 1, can be, for example, the internal combustion engine of a commercial vehicle. The engine has a turbocharger 2 having a turbine 3 in the exhaust-gas line 6 and a compressor 4 in the intake line 7. Compressor 4, which is driven via a shaft 5 by turbine 3, compresses the combustion air taken in at atmospheric pressure $p_1$ to an increased pressure $p_2$. The combustion air compressed in compressor 4 is cooled in a charge air intercooler 8 downstream of compressor 4 and, subsequently, is fed to intake pipe 9 of internal combustion engine 1 at boost pressure $p_{2s}$, for distribution among cylinder intakes 10. Increased boost pressure $P_{2s}$ results in a rise in the engine power and performance.

The exhaust gas is diverted via cylinder outlet manifolds 11 into exhaust-gas line 6 and is fed to turbine 3 at exhaust-gas backpressure $p_3$. Downstream of turbine 3, the expanded exhaust gas at pressure $p_4$ is discharged into the atmosphere.

Turbine 3 has variable turbine geometry, as indicated in FIG. 1 symbolically by reference numeral 12, for adjustably setting the effective turbine cross section. The variable turbine geometry can be, for example, a guide baffle having rotatable guide vanes, the cross section adjustment at the turbine entry being brought about by rotating the vanes.

In a further embodiment, the turbine can be an axial slide turbine having an axially movable guide baffle.

In another embodiment, the turbine can be furnished with a valve upstream of the entry to the exiting acceleration channels. In this embodiment, the exhaust gas flow impacting the turbine wheel can be set in accordance with the operating situation.

As a result of the variable setting of the turbine geometry between a blocking position having a reduced turbine cross section and an open position having a maximum turbine cross section, the level of exhaust-gas backpressure $p_3$ can be variably set. In order to generate high braking power in the engine braking operation, adjustable geometry 12 of turbine 3 is moved to the blocking position, in which the effective turbine entry cross section is reduced. Thereupon, an increased exhaust-gas backpressure $p_3$ builds up, the exhaust gas flows at increased speed through the reduced entry-cross-section of the turbine, and it encounters the turbine wheel that drives compressor 4. Compressor 4 causes an overpressure $p_2$ to build up in intake line 7. At the same time, brake valves at the cylinder outlet of internal combustion engine 1 are opened, through which the air compressed in the cylinder is expelled into exhaust-gas line 6. The braking power of the engine can be influenced by the position of the variable turbine geometry and of the resulting setting of the turbine entry cross section.

In one embodiment, provision is also made for an exhaust-gas recirculation system 13. In certain operating states when the engine produces power, a partial mass flow of the exhaust gas is conveyed from exhaust-gas line 6 into intake line 7 and is mixed with the compressed combustion air, to reduce toxic emissions. The condition to obtain the exhaust-gas recirculation is a pressure drop between exhaust-gas line 6 and intake line 7. Exhaust-gas flow in the direction of intake line 7 is only assured if exhaust-gas backpressure $p_3$ exceeds boost pressure $p_2$ or $p_{2s}$.

Exhaust-gas recirculation system 13 includes a recirculation line 14 and a recirculation valve 15 arranged in recirculation line 14, the recirculation valve being opened in the event that $p_3$ is greater than $p_2$ or $p_{2s}$. Recirculation line 14 can branch off from the exhaust-gas line between cylinder outlet 11 and turbine 3 and empties into the intake line, downstream of charge air intercooler 8, immediately in front of intake pipe 9.

Furthermore, an exhaust-gas cooler 16 can be arranged in recirculation line 14, the temperature of the recirculated exhaust gas being lowered by the exhaust-gas cooler 16. As coolant, compressed combustion intake air is fed to exhaust-gas cooler 16 via a cooling line 17, which branches off from intake line 7 between compressor 4 and charge air cooler 8, and which empties into exhaust-gas line 6, downstream of turbine 3. The air mass flow diverted from intake line 7 via cooling line 17 is regulated by a boost pressure limiting valve 18, which is arranged in cooling line 17 upstream of exhaust-gas cooler 16. If appropriate, cooling line 17 only branches off from intake line 7 downstream of charge air intercooler 8, in order to further reduce the temperature level of the fresh air conveyed through exhaust-gas cooler 16, and to achieve a more powerful cooling of the recirculated exhaust gas. An air mass sensor 19 for measuring the air mass flow conveyed can be arranged immediately upstream of compressor 4.

The functions of the internal combustion engine and of the associated components are controlled by a closed-loop and open-loop control device 20. Closed-loop and open-loop control device 20 is connected via signal lines 21 through 24 to air mass sensor 19, boost pressure limiting valve 18, variable turbine geometry 12, and recirculation valve 15. Control device 20 receives, as input signals, the state and operating variables of the respective components, and generates actuating signals for controlling these components. Further engine functions such as injection or valve movement can be set using additional signal lines not shown in the drawings.

When the engine produces power, variable turbine geometry 12 can be moved towards its blocking position via closed-loop and open-loop control device 20, in order to set an exhaust-gas backpressure $p_3$ that exceeds boost pressure $p_2$ or $p_{2s}$. More exhaust gas piles up in the line upstream of turbine 3, and pressure $p_3$ is increased in that condition. A limit stop is introduced into the control path of the turbine geometry to reduce the turbine cross section, and the turbine geometry is adjusted until it reaches the limit stop in the direction of its blocking position.

Once exhaust-gas backpressure $p_3$ exceeds boost pressure $p_2$ or $p_{2s}$, recirculation valve 15 can be opened and a partial flow of the exhaust gas can be fed to intake line 7 via recirculation line 14. At the same time, a partial flow of the compressed charge air is diverted from the intake line via cooling line 17, as a function of the air mass flow measured in air mass sensor 19 and of the boost pressure in the intake line. In this way, an additional reduction in pressure in the intake line is achieved for the cooling of the exhaust gas.

Figure 2:
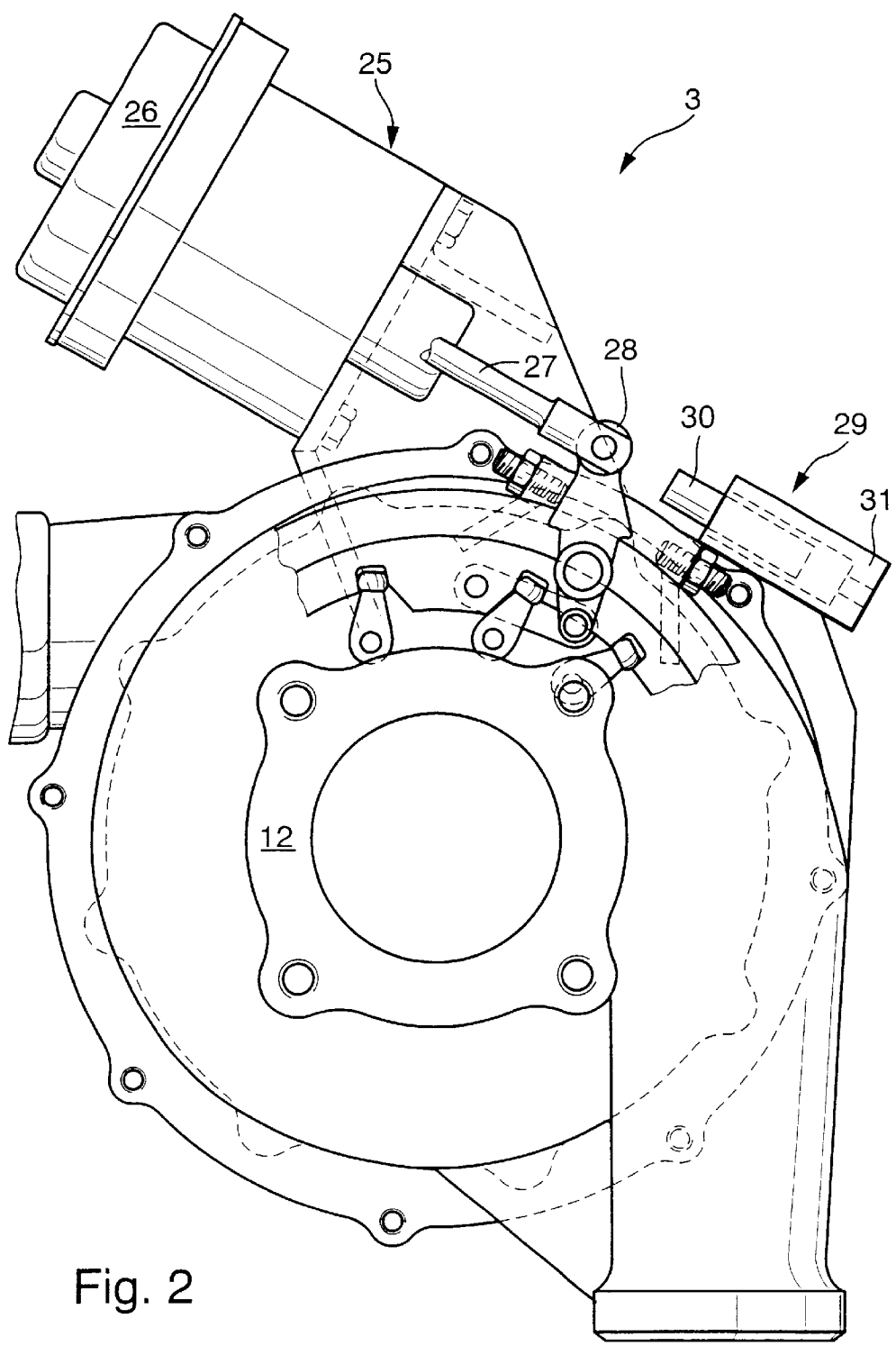
FIG. 2 shows a cutaway view of a turbine having variable turbine geometry and having a limit stop for limiting the control path of the turbine geometry.

Turbine 3 depicted in FIG. 2 has a variable turbine geometry 12 in the form of a guide baffle having rotatable guide vanes, which are arranged in the turbine cross section. The position of variable turbine geometry 12 is changed by a control element 25, which has an adjustment container 26, whose adjustment motion is transferred to the guide baffle via an adjustment rod 27, an adjustment lever 28 hinged on adjustment rod 27, and, if appropriate, further levers. Adjustment rod 27 performs a translatory adjustment motion, in a direction substantially tangential to the turbine passage in the area of the baffle guide.

A limit stop 29 is arranged along the projection of the longitudinal axis of adjustment rod 27 for optimally limiting the control path of control element 25. Limit stop 29 is composed of a limiting piston 30 in a cylinder 31. Limiting piston 30 is extendable as far as control element 25, and the piston motion is co-axial to the adjustment motion of control element 25. In the contracted state of limiting piston 30, limit stop 29 is in the release position, in which the adjustment motion of control element 25 is not hindered. In the extended state, limit stop 29 is in the limiting position, in which the adjustment motion of control element 25 can only be carried out to the point of reaching limit stop 29.

Figure 3:
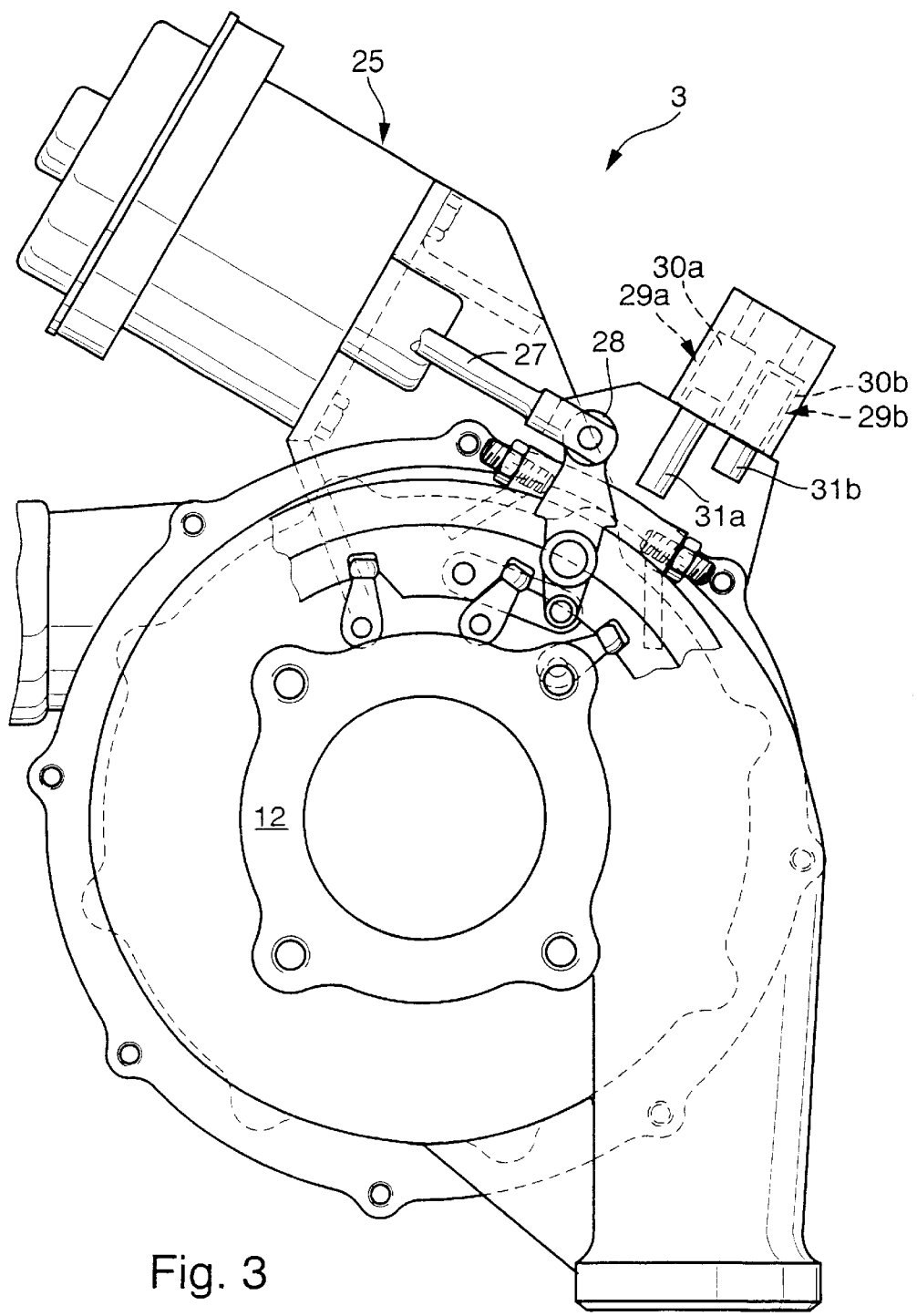
FIG. 3 shows a cutaway view corresponding to that shown in FIG. 2, but having two limit stops.

Turbine 3 depicted in FIG. 3, similarly to the embodiment depicted in FIG. 2, includes a variable turbine geometry 12 in the form of a guide baffle in the turbine cross section. The adjustment motion of control element 25 having adjustment rod 27 and adjustment lever 28 takes place substantially tangential to the turbine passage. The control path of control element 25 can be limited by two limit stops 29a, 29b, which extend into the control path of adjustment rod 27, along a projection of the axis of the control element. Limit stops 29a,b include limiting pistons 31a,b in cylinders 30a,b. The motion of limiting piston 31a,b is preferably substantially perpendicular to the adjustment direction of control element 25, and thus extends approximately radially with respect to the turbine passage. Limiting pistons 31a,b can lie parallel to each other at varying distances from control element 25. In the release position of limit stops 29a,b, limiting pistons 31a,b are withdrawn inside cylinders 30a,b. In the limiting position, the limiting pistons extend into the control path of control element 25. Due to the differing distances of the two limit stops 29a,b, two different limitations can be realized for the adjustment motion of the control element of the turbine geometry.

What is claimed is:

1. An internal combustion engine having a turbocharger with variable turbine geometry, including a compressor disposed in an air intake line of the internal combustion engine, and an exhaust-gas turbine arranged in an exhaust-gas line whose effective turbine cross section is adjustable, comprising:

an exhaust-gas recirculation system having a recirculation line disposed between the exhaust-gas line and the air intake line;

an adjustable recirculation valve adjustable between a blocking position and an open position, wherein in the open position exhaust gas recirculates from the exhaust-gas line to the air intake line;

a slidable limit stop for limiting movement along a control path of the variable turbine geometry, the limit stop being movable between a limiting position that limits movement along the control path of the variable turbine geometry and a release position not limiting said movement; and a closed-loop and open-loop control device for detecting the operating state of the internal combustion engine and for adjusting the internal combustion engine as a function of load and state, wherein control signals moving the limit stop to the limiting position and control signals setting the recirculation valve into the open position are generated in said closed loop and open-loop control device.

2. The internal combustion engine as recited in claim 1, wherein the limit stop is a limiting piston.

3. The internal combustion engine as recited in claim 1, wherein the limit stop is actuatable in one of mechanical, electrical, hydraulic, and pneumatical manner.

4. The internal combustion engine as recited in claim 1, wherein the limit stop limits movement along the control path of a control element adapted for acting upon the variable turbine geometry.

5. The internal combustion engine as recited in claim 1, wherein the limit stop is settable to a plurality of limiting positions as a function of rotational speed of the turbine, the limit stop having a limiting position at low rotational speeds resulting in a smaller turbine cross section than at high rotational speeds of the turbine.

6. The internal combustion engine as recited in claim 5, wherein the limit stop is a two step limit stop, limiting movement of the variable turbine geometry in two limiting positions.

7. The internal combustion engine as recited in claim 6, further comprising two limiting pistons, each movable between a limiting position and a release position.

8. The internal combustion engine as recited in claim 1, further comprising a charge air cooler arranged in the intake pipe, downstream of the compressor.

9. The internal combustion engine as recited in claim 8, wherein the recirculation line is connected to the intake pipe downstream of the charge air cooler.

10. The internal combustion engine as recited in claim 8, wherein the cooling line branches from the intake pipe between the intake pipe and the exhaust-gas cooler, upstream of the charge air cooler.

11. The internal combustion engine as recited in claim 1, wherein the recirculation line branches from the intake pipe upstream of the turbine.

12. An internal combustion engine having a turbocharger with variable turbine geometry, comprising:

a compressor disposed in the intake pipe;

a turbine disposed in the exhaust gas pipe, said turbine having an effective turbine cross section adjustable between a blocking position and an open position;

a closed-loop and open-loop control device for detecting the operating state of the internal combustion engine and for controlling the internal combustion engine as a function of load and state;

an exhaust-gas recirculation system having a recirculation line arranged between the exhaust gas pipe and the intake pipe;

an adjustable recirculation valve operable between a blocking position and an open position, wherein in the open position exhaust gas is recirculated from the exhaust-gas pipe to the intake pipe;

an exhaust-gas cooler disposed in the recirculation line;

a cooling line disposed between the intake line and the exhaust-gas cooler to provide charge air as coolant for the exhaust-gas cooler; and a boost pressure limiting valve adapted to adjust mass flow of charge air conveyed to the exhaust-gas cooler, the boost pressure limiting valve being adjustable by control signals from the control device.

13. The internal combustion engine as recited in claim 12, further comprising an air mass sensor disposed at an inlet of the compressor, the air mass sensor providing a measured air mass flow value to the control device for controlling charge air to the exhaust-gas cooler.

14. An internal combustion engine having a turbocharger with variable turbine geometry, comprising:

a compressor disposed in the intake pipe;

a turbine disposed in the exhaust gas pipe, said turbine having an effective turbine cross section adjustable between a blocking position and an open position;

a closed-loop and open-loop control device for detecting the operating state of the internal combustion engine and for controlling the internal combustion engine as a function of load and state;

an exhaust-gas recirculation system having a recirculation line arranged between the exhaust gas pipe and the intake pipe;

an adjustable recirculation valve operable between a blocking position and an open position, wherein in the open position exhaust gas is recirculated from the exhaust-gas pipe to the intake pipe;

an exhaust-gas cooler disposed in the recirculation line;

a cooling line disposed between the intake line and the exhaust-gas cooler to provide charge air as coolant for the exhaust-gas cooler; and a boost pressure limiting valve adapted to adjust mass flow of charge air conveyed to the exhaust-gas cooler, the boost pressure limiting valve being adjustable by control signals from the control device;

wherein the cooling line is connected to the exhaust-gas pipe downstream of the turbine.

* * * * *